United States Patent [19]

Bujadoux

[11] 4,339,392

[45] Jul. 13, 1982

[54] PROCESS FOR REDUCING METALLIC HALIDES IN THE VAPOR PHASE BY MEANS OF SOLID ORGANOMAGNESIUM COMPOUNDS AND CATALYTIC COMPONENTS RESULTING THEREFROM

[75] Inventor: Karel Bujadoux, Lens, France

[73] Assignee: Societe Chimique des Charbonnages-CdF CHIMIE, Paris, France

[21] Appl. No.: 186,662

[22] Filed: Sep. 12, 1980

[30] Foreign Application Priority Data

Sep. 13, 1979 [FR] France ............................. 79 22842

[51] Int. Cl.³ .......................... C07F 7/28; C07F 9/00; C07F 7/00
[52] U.S. Cl. ..................... 260/429 R; 252/429 A; 260/429.3; 260/429.5; 260/665 G
[58] Field of Search ............. 260/429.3, 429.5, 429 R; 252/429 A

[56] References Cited

U.S. PATENT DOCUMENTS 3,541,074 11/1970 Anderson et al. .......... 252/429 A X
3,663,450 5/1972 Cozerwirth et al. ......... 260/429.5 X
4,069,124 1/1978 Marek et al. ..................... 260/429.3
4,187,254 2/1980 Bujadoux et al. .............. 260/665 G

FOREIGN PATENT DOCUMENTS 1152192 5/1969 United Kingdom .

Primary Examiner—Helen M. S. Sneed
Attorney, Agent, or Firm—Finnegan, Henderson, Farabow, Garrett & Dunner

[57] ABSTRACT

A catalytic component having the formula

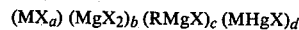

$(MX_a)(MgX_2)_b(RMgX)_c(MHgX)_d$ wherein M is a metal selected from group VI B and group V B of the Periodic Classification, X is a halogen, R is a hydrocarbon radical, $2 \leq a \leq 3.5$, $1 \leq b \leq 30$, $1 \leq c \leq 8$ and $0 \leq d \leq 10$ is prepared by reducing a metallic halide of the metal M, the valency of said metal being 4 if a metal of group IV B is concerned and 4 or 5 if a metal of group V B is concerned, by means of at least one organomagnesium compound having the formula RMgX, the said organomagnesium compound being used in the solid state and reduction of the metallic halide being carried out under a pressure lower than or equal to atmospheric pressure and at a temperature lower than the decomposition point of said organomagnesium compound under the pressure concerned but at least 10° higher than the boiling point or sublimation point of the metallic halide under the pressure concerned.

11 Claims, No Drawings

PROCESS FOR REDUCING METALLIC HALIDES IN THE VAPOR PHASE BY MEANS OF SOLID ORGANOMAGNESIUM COMPOUNDS AND CATALYTIC COMPONENTS RESULTING THEREFROM

BACKGROUND OF THE INVENTION

The present invention concerns a process of reducing vapour phase metallic halides with solid organomagnesium compounds as well as the reduced products obtained.

U.S. Pat. No. 4,187,254 describes organomagnesium compounds obtained in the solid state by an original process as well as the application of these compounds to the synthesis of anhydrous magnesium halide. The same patent also describes the application of these compounds to the reduction of titanium tetrachloride by suspension in anhydrous hydrocarbon solvent. In order to take better advantage of the solid nature of the said organomagnesium compounds, the present invention relates to their application to the direct reduction (without solvent) of metallic halides in the vapour phase.

SUMMARY OF THE INVENTION

The process according to the invention is therefore a process of reducing a metallic halide of a metal from groups IV B and V B of the Periodic Classification, the said metal being in the state with valency 4 if a metal of group IV B is concerned and in the state with valency 4 or 5 if a metal of group V B is concerned, with at least one organomagnesium compound of formula RMgX in which R is a hydrocarbon radical and X is a halogen, characterised in that the said organomagnesium compound is used in the solid state, and in that the reduction is carried out under a pressure lower than or equal to atmospheric pressure and at a temperature lower than the decomposition point of the said organomagnesium compound under the pressure concerned but at least 10° C. higher than the boiling point or sublimation point of the metal halide under the pressure concerned. In the physico-chemical conditions of the process thus defined, the reduction reaction is of the solid-gas type and allows reduced products to be obtained in which the valency of the metal is generally between 2 and 3.5. The reaction can therefore be carried out according to the technique called the fluidised bed technique. It is then noted that the fluidisation of the organomagnesium compound is advantageously improved when the reduction is carried out in the presence of a magnesium halide.

DESCRIPTION OF THE PREFERRED EMBODIMENTS

The reduction process according to the invention allows solid products to be obtained which have low granulometry and a well defined formula:

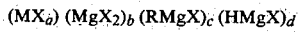

$(MX_a) (MgX_2)_b (RMgX)_c (HMgX)_d$ in which M is the metal from group IV B or V B, $2 \leq a \leq 3.5$, $1 \leq b \leq 30$, $1 < c \leq 8$ and $0 \leq d \leq 10$. It is generally desirable for the halogen X of the reducing organomagnesium compound to be the same as that of the metallic halide required to be reduced, and this halogen can be fluorine, chlorine, bromine or iodine. In fact when the two halogens are different, the reaction is carried out in a similar manner but results in solid products of more complex formula. It will be understood that the coefficient b is equal to 1 when the process according to the invention is carried out in the absence of magnesium halide and greater than 1 when it is carried out in the presence of magnesium halide. With regard to the coefficient d, it should be observed that the reduced solids obtained in accordance with the invention do not generally include magnesium hydrohalide when the temperature of the reaction is correctly controlled and kept within the limits specified for the process; then d=0. However, an uncontrolled rise in the temperature above the decomposition point of the reducing organomagnesium compound, even localised at a single point at the site of the reaction, can lead to the formation of magnesium hydrohalide in a quantity measured by the coefficient d.

The metallic halides which are subjected to reduction in conformity with the process according to the invention are preferably the tetravalent halides of titanium, vanadium and zirconium and the oxyhalides of vanadium $VOX_3$. These halides are reduced, by means of the process according to the invention, at least partly to the state with valency 3 and more generally to the state with valency 2. The mean valency of the reduced solid, defined as the weighted mean of the valency states present in the said solid, is therefore between 2 and 3.5 inclusive.

The solid organomagnesium compounds used as reducing agents within the limits of the process according to the invention are preferably powdery products obtained in conformity with U.S. Pat. No. 4,187,254. It is known that the decomposition temperature of these products depends on the nature of the hydrocarbon radical R; it is generally about 170° C. when R is aliphatic, and 250° C. when R is aromatic. This temperature constitutes the upper limit of the reaction temperatures which can be used within the limits of the present invention. Furthermore, the boiling temperatures of $VOCl_3$, $TiCl_4$ and $VCl_4$ are respectively 127° C., and 136° C. and 148° C. under atmospheric pressure. It is therefore understood that, in order that the reaction temperature not be too near the admissible upper limit and therefore in order to facilitate control of the reaction, it is advisable to carry out the reaction under reduced pressure. However, it is not necessary to lower the reaction pressure to below 1 mm Hg. In these conditions, the reaction temperature is generally between 80° C. and 160° C. As will be understood, the reaction must be carried out in an atmosphere which is absolutely inert and anhydrous. Finally, the duration of the reaction is advantageously between 1 and 10 hours.

The process according to the invention will be carried out advantageously, either discontinuously or continuously, in a fluidised bed reactor, provided with adequate heating means, and with means for measuring and controlling the temperature and pressure.

In the case of the continuous process, the solid particles of reduced product which may be expelled from the reactor are retained by a device of the cyclone type; in addition, the part of the metallic halide subjected to reduction which has not reacted is recycled to the reactor.

The formula of the reduced solid products obtained in conformity with the process according to the invention can easily be defined from the results of quantitative inorganic analysis of the elements M, X and Mg.

The present invention will be better understood from reading the following examples, given by way of illustration.

EXAMPLE 1

The equipment used includes a filter flask provided with a fritted glass and a double wall, heated to about 85° C. by means of an oil circulating pump and placed on top of an evaporator in which titanium tetrachloride is evaporated. It is operated under a pressure of 5 mm Hg. The TiCl$_4$ vapour is entrained by a light current of nitrogen and reacts with a solid mixture of magnesium chloride and n-butyl-magnesium chloride, the molar ratio of the second to the first of these constituents of this mixture being equal to 0.38; the reduction is thus carried out discontinuously for a period of four hours. The titanium tetrachloride which has not reacted is then condensed and recovered. Excellent fluidisation of the solid powder is observed and a reduced solid is recovered, with the following formula, calculated from quantitative inorganic analysis of the elements Ti, Mg and Cl:

$$(TiCl_{3.5})(MgCl_2)_{6.9}(C_4H_9MgCl)_{3.2}$$

EXAMPLES 2 to 5

The equipment used includes an evaporator provided with a needle valve by which the input flow of the titanium tetrachloride is regulated. A bed of glass balls is disposed at the bottom of the evaporator. Over the evaporator is mounted a first cylindrical flask provided with a double envelope through which hot oil circulates and, at its base, with an inset of fritted glass of porosity 1. The solid mixture of magnesium chloride and n-butyl-magnesium chloride is disposed on this inset. The cylindrical flask has mounted over it a second flask, flared in shape, intended to limit the entrainment of solid particles and also provided with a double envelope through which hot oil circulates. The stirring system passing through the two flasks and reaching to the immediate vicinity of the inset is constituted by a stainless steel strip of helicoidal shape driven by a motor by means of a magnetic device. The second flask is provided with an outlet tube having a fritted glass plate for limiting the entrainment of solid particles.

The reaction of reduction of gaseous TiCl$_4$ by solid C$_4$H$_9$MgCl in the presence of MgCl$_2$ is carried out in this equipment for a period of seven hours at a temperature T (°C.) and under a pressure P (mm Hg) specified in the table hereinafter. The molar ratio $$\frac{C_4H_9MgCl}{MgCl_2}$$

used is 0.35 for examples 2 and 4, and 3.6 for

EXAMPLES 3 and 5

The reduction develops without its control becoming difficult and the powder exhibits good fluidisation. The reduced products obtained are subjected to quantitative analysis of the elements Ti, Cl and Mg which produces the formulae:

$$(TiCl_2)(MgCl_2)_b(C_4H_9MgCl)_c(HMgCl)_d$$

in which b, c and d have the values specified in the table hereinafter.

TABLE

| Example | T | P | b | c | d |
|---|---|---|---|---|---|
| 2 | 100 | 1 | 29,6 | 6,3 | 0 |
| 3 | 100 | 80 | 6,2 | 2,8 | 0,8 |
| 4 | 125 | 80 | 13,3 | 1,2 | 0 |
| 5 | 150 | 760 | 12,0 | 8,0 | 9,0 |

The reduced solid products obtained according to the invention are useful as constituents of catalytic systems for olefine polymerization.

What is claimed is:

1. A catalytic component having the formula $$(MX_a)(MgX_2)_b(RMgX)_c(HMgX)_d$$

wherein M is a metal selected from group IV B and group V B of the Periodic Classification, X is a halogen, R is a hydrocarbon radical, $2 \leq a \leq 3.5$, $1 \leq b \leq 30$, $1 < c \leq 8$ and $0 \leq d \leq 10$.

2. A catalytic component according to claim 1, wherein M is selected from titanium and vanadium.

3. A catalytic component according to claim 1 or 2, wherein X is selected from fluorine, chlorine, bromine and iodine.

4. A process for preparing the catalytic component of claim 1 by reducing a metallic halide of a metal selected from group IV B and group V B of the Periodical Classification, the valency of said metal being 4 if a metal of group IV B is concerned and 4 or 5 if a metal of group V B is concerned, comprising contacting at least one organomagnesium compound having the formula RMgX wherein R is a hydrocarbon radical and X is a halogen in the solid state in the absence of a solvent with said metallic halide under a pressure lower than or equal to atmospheric pressure and at a temperature lower than the decomposition point of said organomagnesium compound at said pressure but at least 10° C. higher than the boiling point or sublimation point of said metallic halide at said pressure in the absence of a solvent, so that said metallic halide is in the gaseous state.

5. A process according to claim 4, wherein said reduction of the metallic halide is carried out in the presence of a magnesium halide.

6. A process according to claim 4 or 5, wherein said reduction of the metallic halide is carried out according to the fluidized bed technique.

7. A process according to claim 4 or 5, wherein said duration of said reduction reaction is between 1 and 10 hours.

8. A process according to claim 4 or 5, wherein said metallic halide is selected from tetravalent halides of titanium, vanadium and zirconium and the oxyhalides of vanadium.

9. A process according to claim 4 or 5, wherein said reduction of the metallic halide is carried out at a temperature between 80° and 160° C.

10. A process according to claim 4 or 5, wherein said reduction of the metallic halide is carried out at a pressure between 1 mm Hg and atmospheric pressure.

11. A catalytic component having the formula $$(MX_a)(MgX_2)_b(RMgX)_c(HMgX)_d$$

wherein M is a metal selected from group IV B and group V B of the Periodic Classification, X is a halogen, R is a hydrocarbon radical, $2 \leq a \leq 3.5$, $1 \leq b \leq 30$, $1 \leq c \leq 8$ and $0 \leq d \leq 10$, said catalytic component being made by reducing a metallic halide of a metal selected from group IV B and group V B of the Periodical Classification, the valency of said metal being 4 if a metal of group IV B is concerned and 4 or 5 if a metal of group V B is concerned, by a process comprising contacting at least one organomagnesium compound having the formula RMgX wherein R is a hydrocarbon radical and X is a halogen in the solid state in the absence of a solvent with said metallic halide under a pressure lower than or equal to atmospheric pressure and at a temperature lower than the decomposition point of said organomagnesium compound at said pressure but at least 10° C. higher than the boiling point or sublimation point of said metallic halide at said pressure in the absence of a solvent, so that said metallic halide is in the gaseous state.

* * * * *